United States Patent [19]

Morishita et al.

[11] Patent Number: 4,811,667
[45] Date of Patent: Mar. 14, 1989

[54] TRANSPORTATION SYSTEM OF A FLOATED-CARRIER TYPE

[75] Inventors: Mimpei Morishita; Teruo Azukizawa, both of Tokyo, Japan

[73] Assignee: Kabushiki Kaisha Toshiba, Kawasaki, Japan

[21] Appl. No.: 46,318

[22] Filed: May 6, 1987

[30] Foreign Application Priority Data

May 14, 1986 [JP] Japan ................... 61-109913

[51] Int. Cl.$^4$ .................. B60L 13/06; B60L 13/10
[52] U.S. Cl. .................. 104/284; 104/249; 104/293
[58] Field of Search ......... 104/249, 281–284, 104/286, 289, 290, 293–296, 302, 303, 307; 318/135; 246/182 A, 182 B; 209/904

[56] References Cited

U.S. PATENT DOCUMENTS

| 3,736,881 | 6/1973 | Lorinet | 104/290 X |
| 3,899,979 | 8/1975 | Godsey, Jr. | 104/284 X |
| 3,937,148 | 2/1976 | Simpson | 104/284 X |
| 3,937,431 | 2/1976 | Güntner | 104/290 X |
| 4,652,800 | 3/1987 | Fukuwatari | 318/135 |
| 4,690,066 | 9/1987 | Morishita et al. | 104/284 X |

FOREIGN PATENT DOCUMENTS

| 0041846 | 12/1981 | European Pat. Off. . | |
| 0179188 | 4/1986 | European Pat. Off. . | |
| 5491688 | 7/1981 | Japan | 318/135 |
| 57-3588 | 1/1982 | Japan . | |
| 60-77688 | 5/1985 | Japan | 318/135 |
| 60-96106 | 5/1985 | Japan . | |
| 60-160367 | 8/1985 | Japan . | |
| 61-15557 | 1/1986 | Japan . | |
| 61-102105 | 5/1986 | Japan . | |
| 61-55338 | 11/1986 | Japan . | |

Primary Examiner—James B. Marbert
Assistant Examiner—Joseph D. Pape
Attorney, Agent, or Firm—Oblon, Fisher, Spivak, McClelland & Maier

[57] ABSTRACT

A transportation system of a floated-carrier type according to this invention includes a carrier capable of running along guide rails with a cargo and load carried thereon. A magnetic unit is mounted on the carrier to float the carrier from the guide rails. A slowing-down device is provided to slow down the carrier when the carrier is just about to enter into a stop position. Projections of ferromagnetic material are provided on the side of predetermined portions of guide rails which the magnetic unit of the carrier confronts when the carrier is stopped in the stop position. The magnetic unit, together with the guide rails, establishes a magnetic circuit. The magnetic resistance in the magnetic circuit is smaller at the predetermined portions of the guide rails where the aforementioned projections are provided than at other portions of the guide rails. When, in this case, the carrier arrives substantially at the stop position, the magnetic flux due to the magnetic unit flows through the aforementioned magnetic circuit in an increasing amount, assuring an increased attractive force between the magnetic unit and the predetermined portions of the guide rails where the projections are provided. As a result, the carrier is attracted toward the location of these predetermined portions of the guide rails so that it is positioned precisely in the stop position.

10 Claims, 5 Drawing Sheets

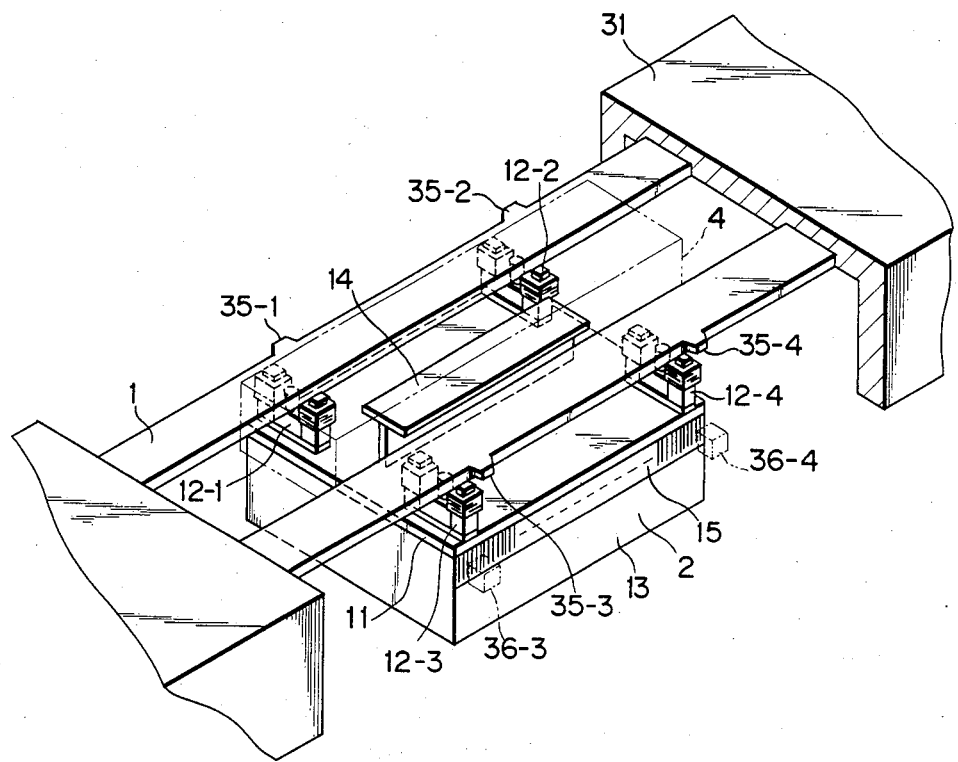
F I G. 1
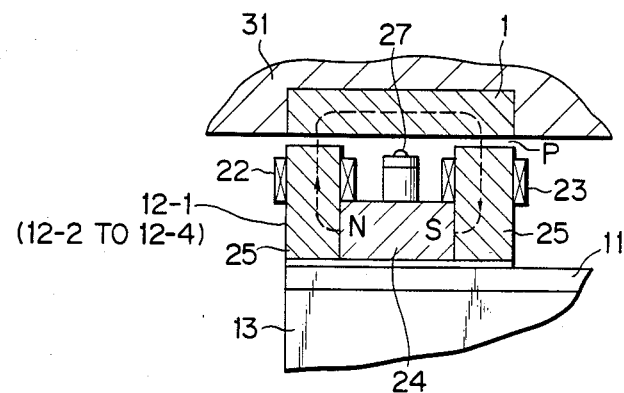
F I G. 2

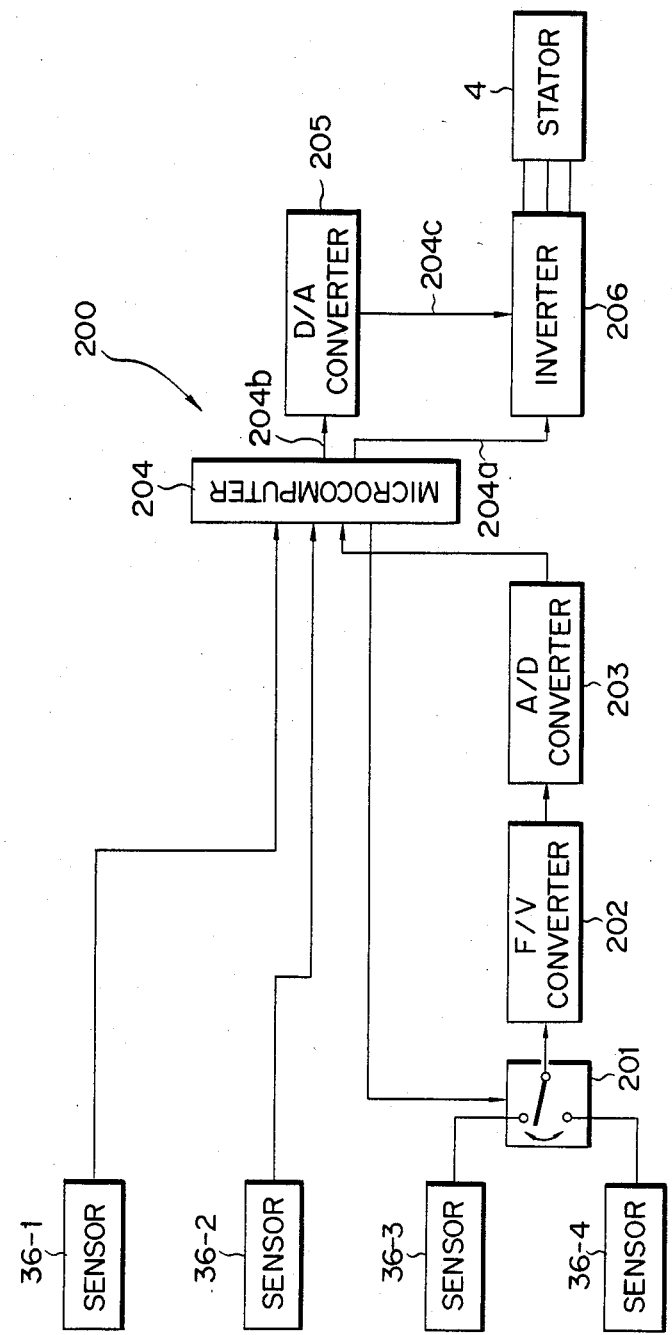
F I G. 5

TRANSPORTATION SYSTEM OF A FLOATED-CARRIER TYPE

BACKGROUND OF THE INVENTION

This invention relates to a transportation system of a floated-carrier type and, in particular, a transportation system of a floated-carrier type including means for positioning the carrier exactly in a stop position.

To increase the degree of office or factory automation, transportation systems have recently been installed in some buildings. Such transportation systems are used to transport slips, documents, cash, samples, or the like, between a plurality of locations in the buildings.

In order to avoid spoiling the environment of the offices or the factories, the transportation systems of this system are expected to produce neither dust nor a high level of noise.

In one such conventional transportation system described in U.S. pat. appl. Ser. No. 726,975, now abandoned filed on Apr. 25, 1985, by inventors hereof, a carrier is magnetically suspended, in a non-contact manner, from a guide rail by means of an electromagnetic attractive force acting between the carrier and the rail, when the carrier is propelled along the rail. Generally, the carrier is either propelled, or braked, by causing the reaction plate mounted on the carrier to be energized by virtue of the stator of a linear induction motor.

In the transportation system it is required that, when the carrier is stopped in a predetermined stop position (station), it is positioned exactly at that location. This occurs in the situations where, for example, the cargo is loaded onto the carrier at the location of the station or the battery of the carrier is charged up. As such a positioning means use may be made of the following conventional means. As the first positioning means, at the stop position, a stopper means is provided which is actuated by a corresponding air cylinder and sandwiches the carrier. In this case, upon the arrival of the carrier, which is caused to coast along after the carrier has been slowed down by virtue of a stator, substantially at the stop position, it is sandwiched by the stopper means, so that the carrier is positioned exactly at the stop position. A second type of positioning means may be electromagnets, provided at the stop position an a guide rail, which position the carrier by magnetically attractive force between themselves and iron plate pasted on the carrier. A third positioning means is composed of two stators which are provided on both ends of the stop position in the direction of run of the carrier. In this case, the two stators are excited in the opposite direction each other so as to position the carrier in proper place. This type of positioning means is disclosed in Japanese Patent Disclosure (KOKAI) No. 57-3588 and Japanese Patent Publication (KOKOKU) No. 61-55338.

However, when the first positioning means is used, the transportation system cannot achieve its function that the carrier is magnetically suspended in a completely non-contact manner from guide rail. The second and third positioning means involves the problem of requiring large-sized equipment.

SUMMARY OF THE INVENTION

It is accordingly the object of this invention to provide a transportation system of a floated-carrier type which can stop a carrier exactly in a stop position through a simpler positioning means.

According to this invention, there is provided a transportation system of a floated-carrier type as set forth below. Guide rails, which are formed of ferromagnetic material, extend in the longitudinal direction. A carrier travels along the guide rails with cargo carried thereon. A magnetic unit includes electromagnets so arranged as to confront the lower surface of the guide rail with an air gap left therebetween, and floats the carrier from the guide rail. The transportation system further includes a device for running the carrier along the guide rails, and slowing it down when the carrier is just arriving at a stop position. Projections of ferromagnetic material are provided on the side of predetermined portions of the guide rails which the magnetic unit of the carrier confronts when the carrier has been stopped at the stop position. The magnetic unit, together with the guide rails, creates a magnetic circuit. The magnetic resistance in the magnetic circuit is smaller at the predetermined portions of the guide rails where the projections are provided as set forth above than at other portions of the guide rails. Accordingly, when the carrier arrives substantially at the stop position, the magnetic flux flows through the aforementioned magnetic circuit in an increasing amount. When this is done, an increased attractive force due to the increased magnetic flux acts between the magnetic unit and the predetermined portions of the guide rails where the projections are provided. As a result, the magnetic unit is attracted toward the predetermined portions of the guide rails, so that it is stopped exactly at the stop position through such simpler positioning means.

BRIEF DESCRIPTION OF THE DRAWINGS

FIG. 1 is a perspective view showing a transportation system of a floated-carrier type according to an embodiment of this invention;

FIG. 2 is a sectional view showing a magnetic unit for floating the carrier from guide rails;

FIG. 5 is a block diagram showing a control circuit for stopping the carrier;

DETAILED DESCRIPTION OF THE PREFERRED EMBODIMENTS

Figure 3:
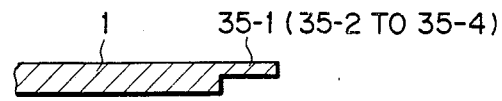
FIG. 3 is a sectional view showing the side portions of the guide rails where projections are formed.

In a transportation system of a floated-carrier type, as shown in FIG. 1, a pair of guide rails 1 longitudinally extend parallel to each other. Carrier 2 is suspended below the pair of guide rails, under a magnetic attractive force, in a non-contact manner from guide rails 1. Carrier 2 is propelled by a linear induction motor along guide rails 1. Guide rail 1 is fixed to the inner surface of the top wall of guide rail cover 31 which has an inverted U-shape in cross-section. Guide rail cover 31 guards moving carrier 2 with a spacing defined therebetween.

Carrier 2 includes supporting plate 11 situated below guide rail 1 in a manner to face the undersurface of guide rail 1 and carrier box 13 supported by supporting plate 11. Four magnetic units 12-1 to 12-4 are located at each of four corners of supporting plate 11. Carrier 2 is levitated by magnetic units 12-1 to 12-4, in the non-contact manner from guide rails 1. Reaction plate 14 is located in the middle of the surface of supporting plate 11 to face stator 4 of a linear induction motor. Stator 4 is located under guide rail cover 31. Upon the excitation of stator 4, a propelling force acts upon carrier 2. When, on the other hand, a traveling magnetic field is produced on stator 4 in a direction opposite to the aforementioned propelling direction, carrier 2 suffers a braking force and is brought to a stop. Reflection plate 15 is provided at each side surface of carrier box 13 in which case light beams emitted from sensors 36-1 to 36-4 as set forth below, are reflected on reflection plate 15.

As is shown in FIG. 2, each magnetic unit 12-1~12-4 is provide with yokes 25, facing guide rail 1. Conducting wires are wound around yokes 25, thus forming coils 22, 23. Air gap P is defined between the top face of each yoke and the lower surface of rail 1. Permanent magnet 24 is used to couple yokes 25 magnetically. Thus, permanent magnet 24, yokes 25, gaps P, and rail 1 constitute a magnetic circuit having a mail flux and a first magnetic attraction Each magnetic unit is further provided with a gap sensor 27 for detecting the amount of clearance of gap P.

In a station, i.e., a predetermined stop position, as shown in FIG. 1, four projections 35-1 to 35-4 are formed on the side of predetermined portions of guide rails 1. When carrier 2 stops in its stopping position, magnetic units 12-1 to 12-4 confront the corresponding the predetermined portions of guide rails 1. That is, the distance between projections 36-1 and 36-2 (or 36-3 and 36-4) ave set equal to that between the corresponding two negative center 12-1 and 12-2 Cor 12-3 and 12-4). Figure shows the magnetic circuit as described above. However, in reality, the actual magnetic flux lines vary slightly from the situation shown in FIG. 2. That is, the main flux of the circuit extends from the tops of yokes 25 directly to the bottom surface of rail 1 as would be expected. However, there is also a certain amount of leakage flux which extends from the top surface of yokes 25 to the side surface of rail In those parts of the rail where the projections extend from the side, the leakage flux is changed somewhat. That is, the leakage flux extends from the top of the yokes to the bottom surface of the projection. In this case the magnetic path of the leakage flux into the projections will be shorter than when it reaches the side surface of the rail.

The magnetic resistance of a magnetic path is represented by the formula magnetic resistance =

$$\frac{\text{length of magnetic path}}{\text{cross sectional area of magnetic path} \times \text{magnetic permeability}}$$

As is clear from this formula, the magnetic resistance will decrease as the magnetic path is shortened. Thus the magnetic resistance of the leakage flux is lower in the areas of the projections than in the rest of the rail so that the amount of leakage flux flowing along this path is larger in the location of the projections. Thus the leakage flux generated from the top of the yoke tends to flow toward the lower surface of the projection rather than toward the side surface of the guide rail when the yoke is near such a projection.

Thus, when the yoke is approaching a position of the projection but is not directly beneath it there is a slantwise attraction from the top of the yoke to the bottom of the projection in the path of the leakage flux. This slantwise attraction may be broken into vertical and horizontal components. Compared to the vertical main flux, the vertical component of the leakage flux is very small and is no greater than 5% of the main flux. Thus, this component does not effect the vertical floating condition of the vehicle. However, when the vehicle is floating it can easily be moved in a horizontal direction with a very small horizontal force. Therefore, the horizontal component of the slantwise attraction is sufficient to move the vehicle in a horizontal direction even though it is very small. This component then services to move the vehicle toward the projection and said the vehicle in directly arriving at this point. Thus the main flux generates a first magnetic attraction in the vehicle direction while the leakage flux is responsible for a second magnetic attraction which attracts the vehicle to the projection location. and 36-4) are set equal to that between the corresponding two magnetic units 12-1 and 12-2 (or 12-3 and 12-4).

Carrier 2 is stopped exactly in the stop position by projections 36-1 to 36-4. As set forth above, magnetic units 12-1 to 12-4 and guide rails 1 create a magnetic circuit in which case a magnetic resistance is smaller at the predetermined portions of guide rails 1 where projections 35-1 to 35-4 are formed than at other portions of guide rails 1. When carrier 2 substantially reaches the stop position, the main magnetic flux flowing through the aforementioned magnetic circuit is augmented by leakage flux comprising a second magnetic attraction weaker than the first magnetic attraction, thus increasing a magnetic attractive force between magnetic units 12-1 to 12-4 and the predetermined portions of guide rail. As a result, magnetic units are attracted toward the predetermined portions of guide rails 1, and then carrier 2 is stopped exactly at the stop position. Projections 35-1 to 35-4 are thin-walled as shown in FIG. 3 so that, when carrier 2 passes through the stop position, projections 35-1 to 35-4 never provide any adverse influence over the run of carrier 2.

Figure 4:
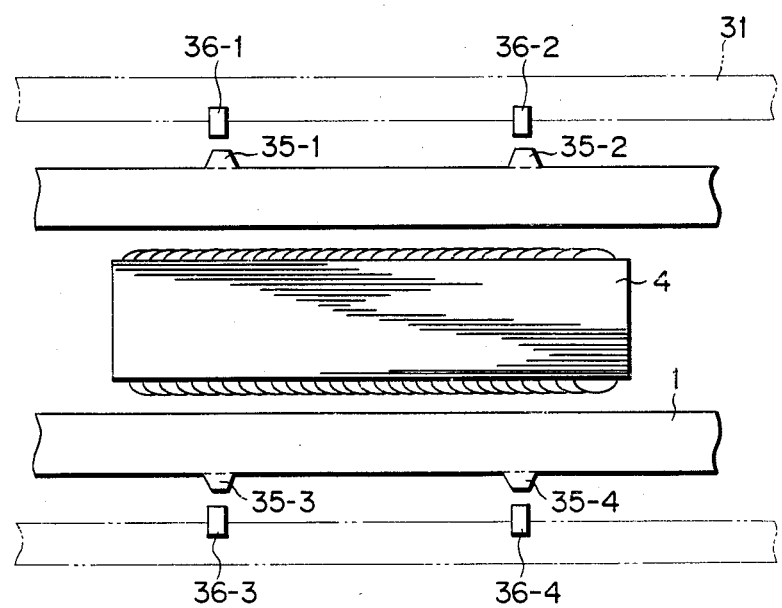
FIG. 4 is a plan view showing a stop position where the carrier is stopped on the transportation system as shown in FIG. 1.

As shown in FIGS. 1 and 4, optical sensors 36-1 to 36-4 of reflection type are so located as to properly confront reflection plates 15 which are formed on both outer side surfaces of carrier 2. A pattern of equidistant vertical stripes is formed on reflection plates 15 facing sensors 36-3 and 36-4 in particular. The speed of carrier 2 is detected through the detection of that stripe pattern by sensors 36-3 and 36-4. Sensors 36-1 and 36-2 detect whether or not carrier 2 is located in the aforementioned predetermined position.

A linear motor controller, not shown, includes control circuit 200, as shown in FIG. 5, which excites stator 4 so as to stop carrier 2 in the stop position. Control circuit 200 includes aforementioned sensors 36-1 to 36-4, microcomputer 204 and inverter 206. Between either one of sensors 36-3 and 36-4 and microcomputer 204, are interposed, switching circuit 201, F/V converter 202 and A/D converter 203 in that order. D/A converter 205 is connected between microcomputer 204 and inverter 206.

The detection signals sensors 36-1 and 36-2 are input directly to microcomputer 204, while the detection signals from sensors 36-3 and 36-4 are supplied to switching circuit 201. Upon receipt of a signal from microcomputer 204, switching circuit 201 has its contacts switched to either one of terminals so that a corresponding one signal may be selected. This is because, upon the movement of carrier 2, either one of sensors 36-3 and 36-4 which are located at predetermined interval, detects the speed of carrier 2. The selected detection signal is supplied to F/V converter 202 where it is converted to a voltage level corresponding to the speed of carrier 2. The voltage of F/V converter 202 is supplied to A/D converter 203 where it is converted to a digital signal. The digital signal is supplied to microcomputer 204.

Microcomputer 204 recognizes the position of carrier 2 on the basis of the detection signals of sensors 36-1 and 36-2 and recognizes the speed of carrier 2 on the basis of the detection signals of sensors 36-3 and 36-4. By so doing, microcomputer 204 delivers signal 204a to inverter 206 directly, and digital signal 204b to D/A converter 205. Digital signal 204b is transformed into analog signal 204c by D/A converter 205. Microcomputer 204 delivers a signal to switching circuit 201, as set forth above.

Inverter 206 puts out phase alternating current to stator 4, based on the value of signal 204c in which case the value of [excitation voltage/excitation frequency] is maintained constant, and at the same time it changes the phase of the alternating current, based on the value of signal 204a. Such action of inverter 206 generates the magnetic field, which travels at the speed corresponding to signal 204b and in the direction corresponding to signal 204a, on stator 4. At that time, if reaction plate 14 confronts stator 4, it receives the electromagnetic force which has the strength corresponding to the speed of the magnetic field and the same traveling direction as the magnetic field. As the result of the above, microcomputer 204 can control the electromagnetic force, given to reaction plate 14 by stator 4, with signals 204a and 204b.

The operation of the transportation system of a floated-carrier type, will now be explained below.

Carrier 2 is suspended from guide rails 1, in a noncontact manner, by means of a magnetic attractive force acting between magnetic units 12-1 to 12-4 and guide rails 1. In this embodiment, units 12-1 to 12-4 are controlled by so-called zero-power control device, so that the minimum necessary electric current is supplied to coils 13 when carrier 2 is made to float. In other words, four permanent magnets 24 always generate an attractive force equal to the total weight of carrier 2 itself and the load. At the same time, coils 22, 23 are excited, so as to maintain the air gap clearances with which the attractive forces between the permanent magnet and rails balance with the total weight of the carrier itself and the load. Coils 22, 23 serve to subordinately cause carrier 5 to float. If the total weight of carrier 2 is changed by the load, current fed to coils 13 is controlled so that gap P is adjusted to a distance such that the total attractive forces between permanent magnet 24 and guide rails 1 balance to the total weight of carrier 2 and the load. In other words, by controlling the current supplied to the coils, clearance of gap P is adjusted to a distance such that carrier 2 is caused to float by means of the magnetic energy of permanent magnet 24 only, despite the existence of disturbances. (The zero-power control device described in U.S. pat. appl. Ser. No. 726,975, filed on Apr. 25, 1985, by inventors hereof.)

As is shown in FIG. 1, if stator 4 is excited when there is a carrier 2 floated just beneath stator 4, reaction plate 14 receives an electromagnetic force from stator 4, and carrier 2 then begins to travel along guide rails 1. The carrier 2 on travel receives a successive propelling force from the stators, which is located along guide rails 1 at predetermined intervals.

When carrier 2 reaches the station, one of two situations exist: (1) the carrier is passed through the station or (2) the carrier 2 is caused to stop at the station. In the former case (1), carrier 2 continues to travel under the action of stator 4 and, if in this case the speed of carrier exceeds a predetermined level, carrier 2 is allowed to run without the action of stator 4 in which case carrier 2 simply runs past the station.

Figure 6:
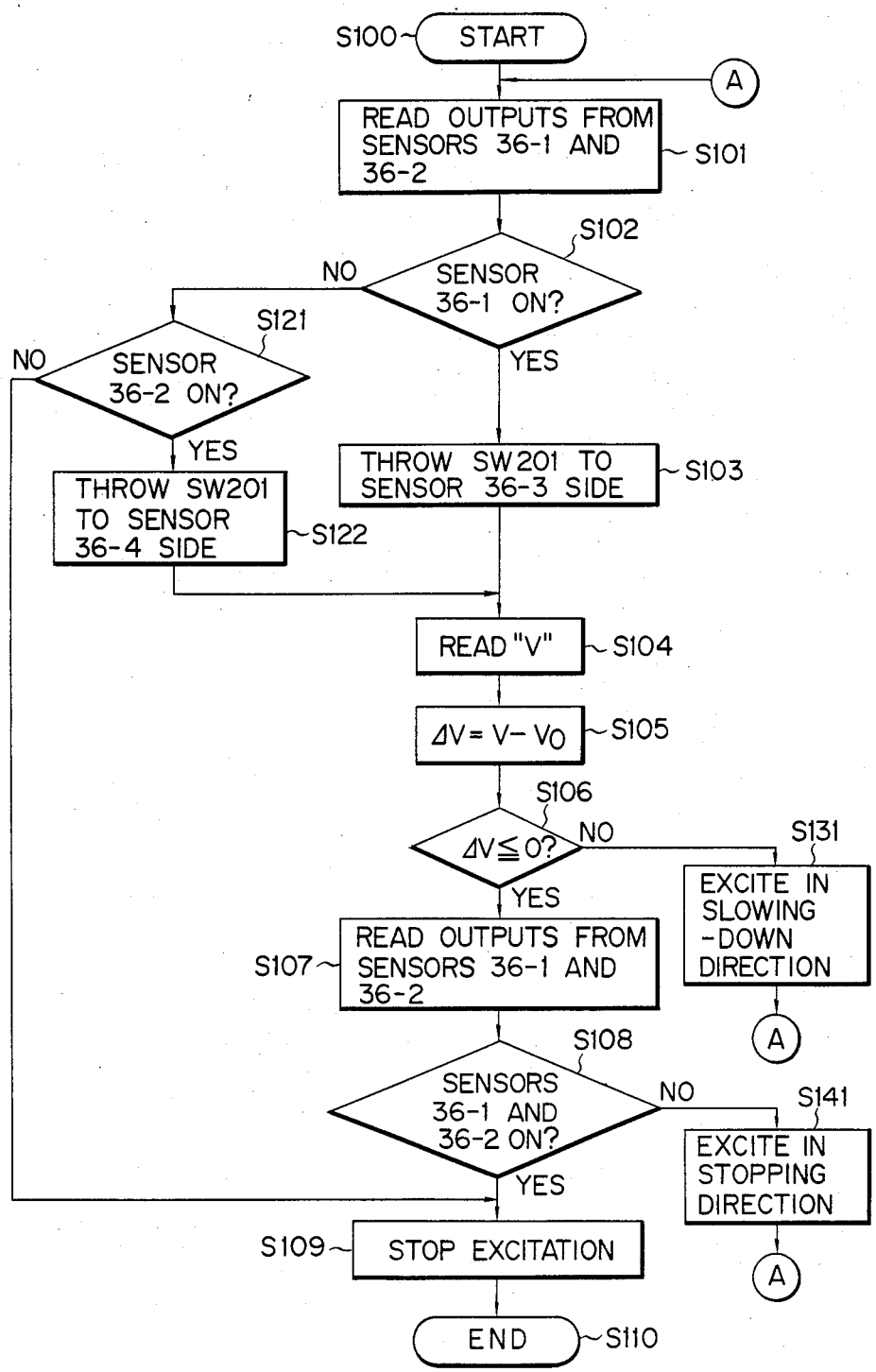
FIG. 6 is a flowchart showing the process for stopping the carrier.

The process of stopping carrier 2 at the station (the latter case (2)) will now be explained below with reference to the flowchart of FIG. 6.

Figure 7:
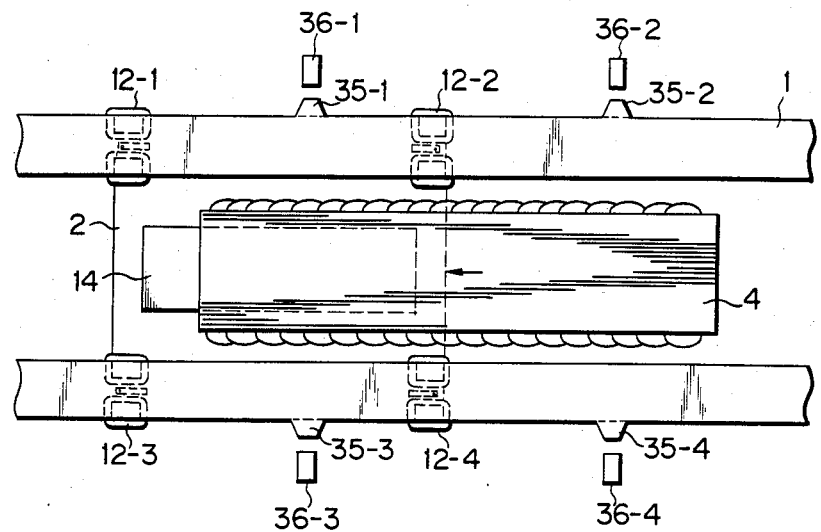
FIGS. 7 and 8 each show a plan view showing the operation of the transportation system when the carrier has been stopped.

Let it be assumed that, as shown in FIG. 7, carrier 2 approaches at a certain speed from left to right. At step S101, the outputs of sensors 36-1 and 36-2 are read out, and at steps S102 and 121, it is judged whether or not sensors 36-1 and 36-2 are ON. Before carrier 2 moves to the stop position, sensors 36-1 and 36-2 are OFF and, at this time, the process skips over to step S109 where stator 4 is not excited.

When carrier 2 is just about to enter into the station, sensor 36-1 is rendered ON to produce a detection signal. At step S103, microcomputer 204 causes the contact of switching circuit 201 to be switched to the terminal of switch 36-3 on the basis of that detection signal. At step S104, the detection signal of sensor 36-3 is supplied to microcomputer 204. At step S105, microcomputer 204 calculates a difference $\Delta V$ $(=V-V_0)$ between the speed V and the reference speed $V_0$ of the carrier. At step S106, it is judged whether or not $\Delta V \leq 0$ and, if $\Delta V$ is positive, the process goes to step S131 where inverter 206 excites stator 4 so as to generate the magnetic field traveling on stator 4, in an arrow-indicated direction of FIG. 7, with the frequency whose magnitude is proportional to the difference $\Delta V$. By so doing, carrier 2 starts to slow down. The process at step S131 goes back to step S101 where the repetition is made until $\Delta V \leq 0$. During the process, at step S121 sensor 36-2 is turned ON when carrier 2 comes to the position where it traverses the light beam which has been emitted from sensor 36-2. At step S122, microcomputer 204, upon receipt of the direction signal from sensor 36-2, causes the contact of switching circuit 201 to be switched to the side of sensor 36-4. Thus the data presenting the carrier speed is delivered via sensor 36-4 to microcomputer 204.

If $\Delta V \leq 0$ at step S106, the outputs of sensors 36-1 and 36-2 are read out at step S107. At step S108 it is judged whether or not the outputs of sensors 36-1 and 36-2 are both rendered ON. If the answer is in the negative, the traveling direction of the magnetic field, as well as the excitation frequency, is so determined, at step S141, that carrier 2 is moved to the stop position at the speed of $V_0$. Thus the process goes back to step S101. For, example, if carrier 2 reaches the position, as shown in FIG. 7, under the situation of $\Delta V \leq 0$, the carrier moves to the stop position by receiving a propelling force opposite to the direction as indicated by an arrow in FIG. 7. At this time, if the situation changes to $\Delta V > 0$, the carrier speed V goes back to $V_0$ by receiving a propelling force opposite to the carrier running direction. In addition, in the case that the speed of carrier doesn't fall below $V_0$ until the carrier passes the predetermined stop position, the carrier encounters a propelling force opposite to that in the carrier running direction. For this reason, it sometimes occurs that, while being reciprocated around the stop position, carrier 2 approaches that position.

Figure 8:
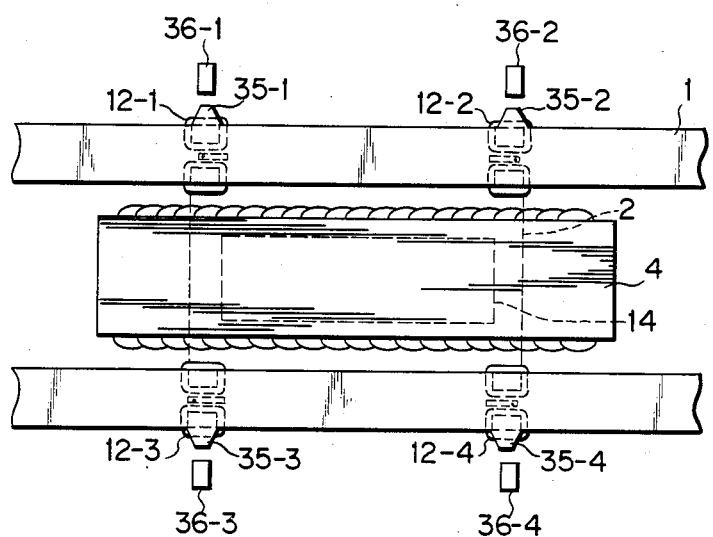

It step S108, when both sensors 36-1 and 36-2 are concurrently turned ON, carrier 2 is judged as being located substantially at the predetermined stop position and, at step S109, inverter 206 stops exciting stator 4 excitation. At this time an attractive force is increased between magnetic units 12-1 to 12-4 and those predetermined portions of guide rails 35-1 to 35-4, where projections 35-1 to 35-4 are provided. As a result, magnetic units are attracted at those predetermined portions of guide rails, so that it is stopped to be located exactly in the predetermined stop position as shown in FIG. 8. In this connection it is to be noted that the speed $V_0$ is set to a sufficiently low level at which carrier 2 can be positioned by projections 36-1 to 36-4.

According to this invention, the excitation frequency for stator 4 is continuously controlled in a manner to be proportional to the speed difference $V - V_0$. For this reason, carrier 2 can swiftly be slowed down even if it enters into the station within a predetermined range of speed.

This invention is not restricted to the aforementioned embodiment. In the aforementioned embodiment, projections 35-1 to 35-4 are formed integral with guide rails 1. However, projections 35-1 to 35-4 may be formed separate from guide rails 1 in which case they are jointed to guide rails 1 by screws or welding. These projections may be formed such that they extend inwardly of guide rails 1.

According to the aforementioned embodiment, the guide rails are comprised of a pair of lines. Alternatively, however, the pair of lines may be replaced by either one or three or more lines. Furthermore, the magnetic unit may be so constructed that the carrier is caused to float by means of the magnetic force of the coils only, without any permanent magnet.

What is claimed is:

1. A transportation system of a floated-carrier type comprising:
    a guide rail made of ferromagnetic material and extending in a longitudinal direction, said guide rail having a side surface and a lower surface;
    a carrier with a cargo carried thereon capable of running along the guide rail;
    a magnetic unit mounted on the carrier and having an electromagnet confronting the lower surfaces of the guide rail with an air gap defined therebetween, the electromagnet generating main flux and leakage flux, the electromagnet and guide rail creating a magnetic circuit along which the main flux passes, thereby producing a first magnetic attraction between the electromagnet and guide rail, whereby said carrier is floated relative to the guide rails in a non-contact manner;
    means for running said carrier along the guide rail and for slowing down said carrier when said carrier is just about to enter into a stop position, said means for running including carrier-stopping means for substantially stopping said carrier at the stop position; and
    a ferromagnetic member provided on the side surface of a predetermined portion of said guide rail, the predetermined portion being located such that the electromagnetic of said magnetic unit confronts the predetermined portion when the carrier has stopped at the stop position,
    whereby, when said carrier is substantially stopped at the stop position, the leakage flux generated by the electromagnet flows through the ferromagnetic member, thereby producing a second magnetic attraction weaker than the first magnetic attraction between the electromagnet and said ferromagnetic member, so that the electromagnet is attracted toward the predetermined portion, allowing said carrier to be position at the stop position.

2. The transportation system according to claim 1, wherein said member constitutes a projection which is provided on the side of the predetermined portion of said guide rail.

3. The transportation system according to claim 2, wherein two projections are provided on said guide rails and are separated in a longitudinal direction, and two magnetic units are provided on the carrier and are separated in the longitudinal direction, in which a distance between said two projections is substantially equal to that between said two magnetic units.

4. The transportation system according to claim 2, wherein a pair of guide rails are provided with a pair of said projections, respectively, and four magnetic units are located such that one is mounted at each corner of said carrier.

5. The transportation system according to claim 1, wherein said means for slowing down the carrier has a stator for a linear induction motor and a reaction plate mounted on said carrier and receiving a propelling force from the stator.

6. The transportation system according to claim 5, wherein said means for slowing down the carrier includes:
    a first sensor means for detecting the position of said carrier, in the stop position, and delivering a detection signal;
    a second sensor means for detecting the speed of said carrier;
    an inverter for controlling a three phase alternating current which is supplied to the stator to excite said stator, while switching the phase of said three phase alternating current; and
    a microcomputer for receiving first and second detection signals and supplying to said inverter signals having information about an excitation frequency, an excitation voltage for said stator, and the phase for said three phase alternating current.

7. The transportation system according to claim 6, wherein in the stop position, said first sensor means has a pair of first optical sensors which are located in the longitudinal direction over a distance substantially equal to the longitudinal distance of said carrier.

8. The transportation system according to claim 6, wherein the second sensor means have a pair of second optical sensors being provided in the stop position of said carrier and in the longitudinal direction over a distance substantially equal to the longitudinal distance of said carrier; a plurality of stripes being formed at a predetermined interval on the side surface of said carrier; said slowing-down means having a switching circuit which supplies to said microcomputer either one of two detection signals which are delivered from said pair of second optical sensors.

9. The transportation system according to claim 2, wherein said member is formed integral with said guide rails.

10. The transportation system according to claim 1, wherein said magnetic unit is composed of permanent magnets capable of providing magnetic energy, with which carrier can be kept floating against the weight thereof and the load thereon, and electromagnets adapted to be excited so as to maintain an air gap clearance, with which the magnetic attractive force acting between the permanent magnets and the ferromagnetic guide rail balances with the total weight of the carrier itself and the load, regardless of a change of the load weight.

* * * * *